June 3, 1969  D. C. TRIMBLE  3,447,199
FOAMED PLASTIC HINGE AND ITS MANUFACTURE
Filed April 8, 1966

DAVID C. TRIMBLE
INVENTOR.

BY

United States Patent Office 3,447,199
Patented June 3, 1969

3,447,199
FOAMED PLASTIC HINGE AND
ITS MANUFACTURE
David C. Trimble, Yorklynn, Del., assignor, by mesne assignments, to Hercules Incorporated, New Castle County, Del., a corporation of Delaware
Filed Apr. 8, 1966, Ser. No. 541,189
Int. Cl. B29c 3/00
U.S. Cl. 16—150                             2 Claims

ABSTRACT OF THE DISCLOSURE

This invention relates to a method of forming an integral hinge in a foamed plastic article and to the hinge so formed, the method comprising heating a workpiece consisting of a sheet of foamed plastic to forming temperature, introducing the same into a mold wherein the workpiece is thermoformed while the hinge is formed simultaneously by means of a blade on one mold section that is advanced into the workpiece and into a resilient backing member on the other mold section whereby the foamed material is collapsed by the blade and is bent sharply around the edge thereof by the deformed backing member to form a thin neck of collapsed material that is displaced outwardly of the surface of the material adjacent the backing member, after which the workpiece is cooled to setting temperature and the mold is opened to remove the same. The resulting hinge is characterized by very low pivotal resistance and by a minimum memory or swing-back tendency.

---

The present invention relates to a method for forming a hinge in a foamed plastic and to the hinge so formed.

The objects of this invention are to provide in a foamed plastic a hinge that will accommodate swinging of the interconnected elements through an arc of at least one hundred and eightly degrees, will be substantially "dead" or, in other words, will have a minimum memory or swing-back tendency in both the open and closed positions, and will provide sufficient support for the hinged elements to minimize "racking," that is, warping or relative motion of the hinged elements in a direction other than angularly about the pivot axis of the hinge. Further objects of this invention are to provide in a foamed plastic a hinge that is inexpensive, can be made during thermoforming of the article in which it is embodied, and is durable.

Briefly, the present invention comprises a hinge formed in a foamed plastic by striking the same along the hinge line with a relatively sharp blade or striker while the plastic is heated to a forming temperature and while it is supported on the surface opposite to the engaged surface by a backing member that is either resilient or resiliently mounted. Without severing the material, the striker is advanced completely through the foamed plastic and for a short distance beyond the supported surface thereof, that is, either into a groove in the backing member or into the backing member which yields against the thrust of the striker. The result of this operation is that, at the line engaged by the edge of the striker, the foam is completely collapsed against the backing member and is reduced in cross-section to a very narrow and sharply folded neck of material of high density that is disposed at or slightly beyond the supported surface of the material that is against the backing member. The neck so formed constitutes a very flexible hinge having very little swing-back tendencies and which is capable of repeated flexures without failure. At the same time, being formed completely at the supported surface of the material, i.e., the surface against the backing member, the material can be folded a full one hundred and eighty degrees about the hinge in the direction to bring the supported surfaces on the opposite sides of the hinge into abutment with each other.

With the above and other objects in mind, a preferred embodiment of the invention is hereinafter described in connection with the accompanying drawings, in which.

Figure 1:
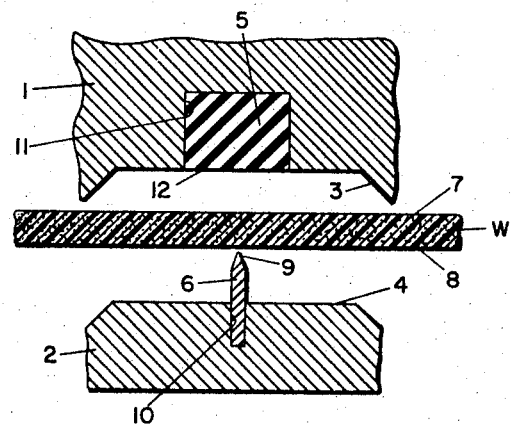
FIG. 1 is a fragmentary sectional view through apparatus for forming a hinge in accordance with this invention, the apparatus being shown in its open position.

The present invention is herein described in connection with molding apparatus that includes upper and lower mold halves or sections 1 and 2, which may be of any desired configuration for the thermoforming of the article in which the hinge is embodied. For forming the hinge, the mold sections 1 and 2 have in the respective work-engaging or molding surfaces 3 and 4 thereof a strip-like backing member 5 of resilient material and an opposed elongated blade 6 longitudinally co-extensive with the member 5. The work W is disposed against the backing member 5 with the surface thereof in engagement with or opposed to the backing member 5 constituting the supported surface 7 and the opposite surface thereof constituting the free surface 8 thereof.

As illustrated, the blade 6 is in the form of a sharpened steel blade, for example, stock material for hack-saw blades, and has a knife-like leading edge 9 that, when the mold is closed, is adapted to be advanced into the work W from the free surface 8 thereof, and thereby defines the hinge line H therein. The blade 6 is disposed substantially normal to the work W and is secured in the mold section 2 in any suitable manner, for example, as by press-fitting into a slot 10. The blade 6 is of such a height that when the mold is completely closed, the edge 9 penetrates into the backing member 5 a slight distance.

The backing member 5 is mounted in the mold section 1 as by adhesively securing the same in a groove 11 in the work-engaging surface 3 thereof, the groove 11 being deep enough in relation to the thickness of the member 5 so that its working face 12 is flush with or in the plane of the work-engaging surface 3 of the upper mold section 1. The backing member 5 is disposed such that the longitudinal center line of the working face 12 thereof is aligned with the edge 9 of the blade 6. While the resilience of the backing member 5 can accommodate some misalignment of the blade 6 in the direction normal to the backing member 5, the edge 9 of the blade 6 should be substantially parallel to the working face 12 of the backing member 5 in order to obtain relatively uniform striking or penetration of the work W along the entire hinge line H when the mold is closed. The required accuracy can normally be obtained, for example, by maintaining manufacturing tolerances in the depth of the slot 10 and in the width of the blade 6, as well as in the thickness of the backing member 5 and the depth of the groove 11 in which it is secured.

The methods of securing the blade 6 and the backing member 5 in the mold sections 1 and 2 are not critical and the above described methods are only for purposes of illustration. It will be apparent that numerous alternative constructions could be substituted without departing from the scope of the invention, for example, the backing member 5 could be secured by a tongue and groove arrangement in which the member 5 is of increasing cross-section in the direction away from the working face 12 and inserted endwise into an undercut groove in the mold section 1, or the blade 6 could be secured in position in the mold section 2 by set screws or by molding the section 2 about the shank portion thereof, or the blade 6 could be made adjustable to provide for aligning the edge 9 thereof relatively to the working face 12 of the backing member 5, which alignment could, of course, be facilitated by the use of adjusting screws. If the blade 6 were removably secured in the mold section 2, there would be the additional advantage of facilitating removal of the blade 6 for sharpening or replacement in the event it were worn or damaged.

The backing member 5, while resilient, is nevertheless relatively hard so that it will yield reluctantly against the thrust of the blade 6. The lower limit on the hardness of the backing member 5 is that it must be sufficiently hard so that, in its resistance to the thrust of the blade 6, the work W will be pinched between them with enough pressure to reduce it to a relatively narrow neck of material, which in the finished product is the hinge H. At the same time, the backing member 5 must not be so hard that it constitutes an anvil against which the work W is crushed or pinched to the point of severing.

Figure 2:
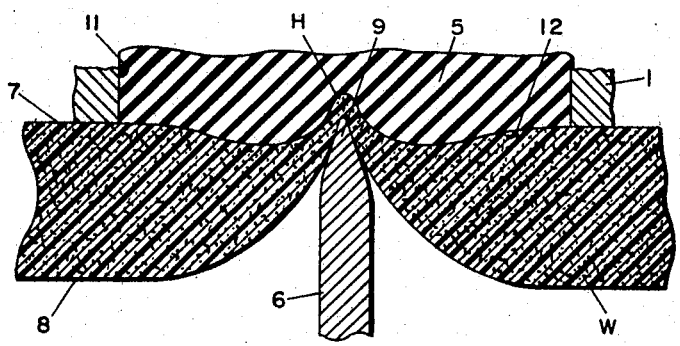
FIG. 2 is a fragmentary sectional view similar to FIG. 1 but on an enlarged scale and showing the apparatus in its closed or operative position.

A further function of the backing member 5 and a limitation of the resilience thereof is that it is designed to force the work W about the edge 9 of the blade 6 as illustrated in FIG. 2. Normally, as the blade 6 advances through the work W, the successive increments or layers of the work W are tensioned progressively as they are pulled by the advancing edge 9 of the blade, that is, the skin on the free surface 8 is pulled or extended as it is forced by the edge 9 from its initial position on the free surface 8 toward the opposite or supported surface 7, and each underlying layer of the material is pulled or extended in a corresponding manner a progressively reduced amount with the minimum extension being at the layer that is at the supported surface 7. Without the backing member 5, the tensioning of the successive layers of the work W as they are pulled by the blade 6 would cause the layers to assume a configuration that extends initially in a straight line inclined outwardly from the edge 9 toward the free surface 8, somewhat in the nature of the wake of a boat, and then to curve at a decreasing angle relative to the free surface 8 so that it merges smoothly into that surface. The backing member 5 serves to modify the configuration by forcing the work W sharply about the edge 9 as illustrated in FIG. 2. This is accomplished by virtue of the fact that, as the edge 9 pushes into the backing member 5, it displaces the material thereof, causing it to bulge forwardly about the edge 9, thereby forcing the work W against the sides of the blade 6 behind the edge 9. If the backing member 5 were too soft, it would not develop sufficient pressure to force or fold the work W sharply about the edge 9.

While the dimensions of the backing member 5 are not critical, the width and depth thereof must be sufficient to afford the necessary resiliency. If the thickness of the member 5 is too shallow relative to the depth of penetration by the edge 9 of the blade 6, the backing or reinforcement afforded by the bottom of the groove 11 will in effect reduce the resilience of the material and the member 5 will be severed by the edge 9. If the backing member 5 were too narrow, it would not bulge about the edge 9 to bend the work W about the same. A satisfactory construction for the backing member 5 is to form the same as a rod of rubber with a hardness of about 80 or 90 on the Shore Hardness Scale A, and which has a cross-section that is about one-half inch square.

The material from which the work W is formed may be any suitable thermoplastic foam, such as polystyrene, polyethylene, polypropylene, copolymers of ethylene and propylene, and the like, and having a density and thickness sufficient to permit formation of a hinge. Generally, the density and the thickness of the foam can be determined by considerations other than that of hinge-forming, for example, to obtain sufficient rigidity in the material to adapt the same for use in an egg carton. From the hinge-forming standpoint, the only limitation is that the material cannot be so thin or of such low density that when it is reduced by the blade 6 against the backing member 5, there would not be sufficient material to form a hinge. While there is a practical limitation on the thickness and density of the foam at the upper range, the hinge-forming method as herein contemplated can be used with relatively thick foams in which the skin or surface layer at the free surface in being pulled by the edge 9 are stressed beyond the rupture point, since, with the material at forming temperature, the ruptured layers become bonded or adhered to the underlying unruptured layers and the resulting hinge is formed in the underlying unruptured layers.

The hinge formation as herein contemplated will also accommodate plastic foams having orientation or an unfoamed surface layer or skin which may be selected because of other desired characteristics in the completed article in which the hinge is embodied, e.g., formability, appearance, imperviousness, and printability. With an oriented foam plastic sheet, where a minimum of memory or swing-back tendency is desired, the hinge is formed in a direction parallel to the direction of orientation of the material. With a hinge formed transversely to the direction of orientation, a stronger hinge is produced but there is some increase in the memory or swing-back tendency of the material.

In the method of this invention, the work W is clamped in a frame and heated to a forming temperature, which is that temperature, below the melting temperature, at which the material can be shaped by thermoforming operations, such as vacuum forming, and which for polystyrene foam is about 220° F. The heated film in the frame is then introduced into the mold and, when the mold sections 1 and 2 are closed, the work W is formed into the shape of the mold. Vacuum or pressure may be used in the conventional manner to effect or to assist in forming the work W. At the same time that the mold acts to form the sheet, the blade 6 cooperates with the backing member 5 to form the hinge H. After the foam has set, the mold sections 1 and 2 are opened and the work W is removed, and, if required, is thereafter finished by trimming.

The speed at which the blade 6 advances into the sheet is not critical and is well within the range of speeds normally employed in closing of the molds.

While the backing member 5 is herein illustrated as being resilient, the backing member could be formed as a resiliently or yieldably mounted rigid member with a V-shaped groove for receiving the leading edge 9 of the blade 6. Thus, when the blade 6 forces the collapsed material into the groove, the diverging side walls of the groove force the material about the edge 9 thereof. At the same time, the yieldability of the member provides for alignment of the member with the edge of the blade while the pressure developed between the sides of the groove and the side of the blade distribute the pressure and prevent an excessive pressure at the edge 9 that would tend to sever the material.

In an effort to facilitate an understanding of the present invention and without intending to limit the same as to the theory involved, it would appear that as the blade 6 advances and pulls the successive layers of the work W, it extends or elongates them to effect an orientation. At the same time, the cells of the foam are collapsed and as the opposite walls of the cells are brought into contact, and being at forming temperature, they become bonded or adhered. There is thus produced at the hinge H a thinned section having a density approximating that of the solid or unfoamed material and composed of the laminated and oriented walls of the collapsed cells. Outwardly of the hinge H, the work W is of progressively greater thickness and reducing density until, at a point back from the hinge H, the work W has the normal thickness and density of the foam in which the hinge H is formed.

Figure 3:
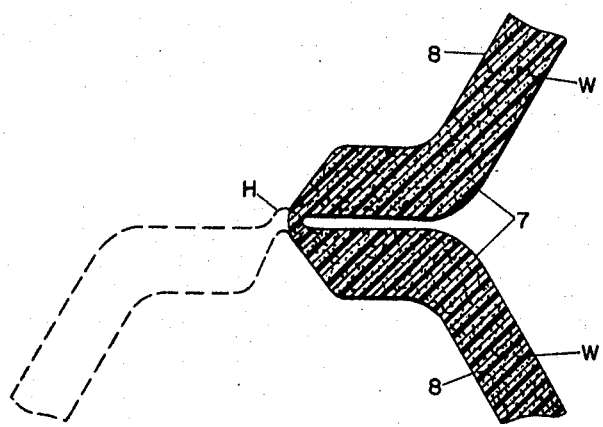
FIG. 3 is a fragmentary sectional view of a foamed article having a hinge formed in accordance with this invention.

Formed as herein contemplated, there is produced the hinge H which is flexible to the point that it will yield without any appreciable spring-back tendency, and yet is durable and sufficiently strong to resist "racking." Also, being formed as a very sharp neck of material that is disposed out of the plane of the material, the hinge can accommodate a full one hundred and eighty degrees bend as illustrated in FIG. 3 and at the same time will permit the hinged sections to lie virtually flat or, in other words, with a minimum of spacing of the two hinged sections at the hinge line.

What I claim and desire to protect by Letters Patent is:

1. A foamed plastic article formed with a hinge having minimum memory and pivotal resistance, comprising, an article of foamed plastic material having a free surface and a hinge surface opposite thereto and a hinge consisting of a relatively thin neck of material disposed adjacent said hinge surface, said free surface of the article converging toward said hinge surface on both sides laterally of and in the direction toward said neck and said foamed material having the cells thereof progressively collapsed in the direction toward said neck from an uncollapsed condition outwardly of said converging portion of said free surface to a fully collapsed condition at said neck whereby said neck has a thickness corresponding substantially to the unfoamed thickness of said material, said neck having a relatively sharp bend defining the hinge line and having the free surface of the material in said neck disposed substantially in the plane of the hinge surface of the foamed material and the hinge surface of the material in said neck displaced outwardly from the hinge surface of said foamed material.

2. A method of thermoforming a foamed plastic article with a substantially unfoamed hinge, comprising:

heating a foamed plastic workpiece to forming temperature, providing a mold having separable mold sections and including molding surfaces and hinge forming means, said hinge forming means comprising a blade on and extending from one of the mold sections to a leading edge disposed along a line conforming to the desired hinge line and a yieldable strip-like backing member on the other of the mold sections with the working face of the backing member substantially flush with a molding surface and aligned longitudinally in opposed relation with the edge of the blade, introducing the heated workpiece into the mold with the surface of the workpiece opposed to the backing member constituting a supported surface and the opposite surface of the material constituting a free surface, closing the mold sections to bring the leading edge of the blade into contact with the workpiece at the free surface thereof along the desired hinge line and to advance said edge into the workpiece and beyond the supported surface into the backing member to compress the workpiece between the edge of the blade and the backing member to a relatively narrow neck in which the foam is collapsed and which is displaced beyond the supported surface with the backing member folding the workpiece sharply about the edge of the blade, cooling the workpiece to set the same, and opening the mold sections to withdraw the blade and to permit removal of the workpiece.

References Cited

UNITED STATES PATENTS

| | | |
|---|---|---|
| 2,845,104 | 7/1958 | Frankel. |
| 3,043,354 | 7/1962 | Fitzgerald _____ 16—150 XR |
| 3,186,574 | 6/1965 | Davidson _____ 16—150 XR |
| 2,781,849 | 2/1957 | Bladergroen et al. ___ 164—125 |
| 2,797,443 | 7/1957 | Carlson _____ 264—321 XR |
| 3,222,437 | 12/1965 | Schilling _____ 264—54 |
| 3,244,346 | 4/1966 | Tijunelis _____ 264—321 XR |
| 3,274,047 | 9/1966 | Sloan _____ 161—46 |

PHILIP E. ANDERSON, *Primary Examiner.*

U.S. Cl. X.R.

161—99; 220—31; 229—44; 264—320